US006640444B1

(12) United States Patent
Harada et al.

(10) Patent No.: US 6,640,444 B1
(45) Date of Patent: Nov. 4, 2003

(54) PORTABLE TRIMMER WITH BRAKE DEVICE FOR CUTTER

(75) Inventors: Kazuo Harada, Yokosuka (JP); Toshiyuki Takano, Yokohama (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/461,430

(22) Filed: Dec. 16, 1999

(30) Foreign Application Priority Data

Dec. 16, 1998 (JP) .......................................... 10-357209

(51) Int. Cl.[7] ............................................... A01D 69/10

(52) U.S. Cl. .................... 30/277.4; 30/DIG. 5; 56/11.3; 83/400; 83/DIG. 1; 173/221

(58) Field of Search ...................... 173/221; 83/DIG. 1, 83/399, 400; 30/277.4, DIG. 5, 276; 56/11.3, 239

(56) References Cited

U.S. PATENT DOCUMENTS

| | | | | | |
|---|---|---|---|---|---|
| 3,793,727 | A | * | 2/1974 | Moore | 83/DIG. 1 X |
| 4,006,528 | A | * | 2/1977 | Katsuya | 30/276 |
| 4,152,833 | A | * | 5/1979 | Phillips | 83/DIG. 1 X |
| 4,226,312 | A | * | 10/1980 | Zindler | 56/11.3 X |
| 4,277,936 | A | * | 7/1981 | Hoff | 56/11.3 X |
| 4,309,862 | A | * | 1/1982 | Carlson | 56/11.3 X |
| 4,466,232 | A | * | 8/1984 | Beugelsdyk et al. | 56/11.3 X |
| 4,667,459 | A | * | 5/1987 | Scanland et al. | 56/11.3 |
| 4,694,942 | A | * | 9/1987 | Ogano et al. | 56/11.3 X |
| 4,696,381 | A | * | 9/1987 | Jonson, Sr. | 56/11.3 X |
| 4,753,012 | A | * | 6/1988 | Schurr | 83/DIG. 1 X |
| 5,146,735 | A | * | 9/1992 | McDonner | 56/11.3 |
| 5,317,944 | A | * | 6/1994 | Hewitt | 83/DIG. 1 X |
| 5,636,444 | A | * | 6/1997 | Nickel | 30/277.4 X |
| 5,782,001 | A | * | 7/1998 | Gray | 30/391 |
| 5,791,057 | A | * | 8/1998 | Nakamura et al. | 83/DIG. 1 X |
| 5,806,374 | A | * | 9/1998 | Mizutani et al. | 56/11.3 X |
| 6,047,614 | A | * | 4/2000 | Beugelsdyk et al. | 56/11.3 X |
| 6,055,797 | A | * | 5/2000 | Nagashima | 56/11.3 |
| 6,167,973 | B1 | * | 1/2001 | Nagashima | 173/221 |
| 6,176,016 | B1 | * | 1/2001 | Higashi et al. | 56/1.6 X |

FOREIGN PATENT DOCUMENTS

| | | |
|---|---|---|
| JP | 52-12089 | 4/1977 |
| JP | 5-92470 | 12/1993 |

* cited by examiner

*Primary Examiner*—Rinaldi I. Rada
*Assistant Examiner*—Charles Goodman
(74) *Attorney, Agent, or Firm*—Jacobson Holman PLLC

(57) ABSTRACT

A portable trimmer in which the power generated by an internal combustion engine is transmitted to a cutter via a centrifugal clutch and the output power of the internal combustion engine is controlled by operating a manual throttle lever, thereby adjusting the throttle opening of a throttle valve via a throttle wire. The portable trimmer includes a friction member arranged to face the clutch drum of the centrifugal clutch, a moving member which is connected to the friction member and moves the friction member between a braking position where the friction member is pressed against the clutch drum and a non-braking position where the friction member is kept away from the clutch drum so as to release the braking, a manual release device for moving the moving member from the braking position to the non-braking position, and a release restricting device for controlling the behavior of the manual release device.

2 Claims, 12 Drawing Sheets

PORTABLE TRIMMER WITH BRAKE DEVICE FOR CUTTER

BACKGROUND OF THE INVENTION

The present invention relates to a portable trimmer such as a shoulder-type portable trimmer or a hedge trimmer having a cutter, and in particular, to a portable trimmer equipped with a brake device for preventing a cutter from being operated unexpectedly.

DESCRIPTION OF THE PRIOR ART

A portable trimmer such as a shoulder-type portable trimmer, a backpack-type portable trimmer, a hedge trimmer or the like generally employs a driving mechanism which transmits the power generated by an internal combustion engine to a cutter through a centrifugal clutch. In these portable trimmers, as disclosed, for example, in the Japanese Patent Publication No. Sho 52-12089, a brake device is proposed in which a friction member such as a brake shoe, a brake band or the like slidably engages with a clutch drum of the centrifugal clutch to prevent a cutter from free rotation in order to provide improved safety at a starting time thereof. According to the device disclosed therein, when an operator grips a brake lever, the brake device is actuated to stop rotation of the clutch drum and whereby the cutter is prevented from being rotated unexpectedly. After having released the brake lever and thereby de-activating the brake device, the operator holds a throttle lever, adjusts a throttle opening of a throttle valve to control the power from the internal combustion engine, and thereby drives the cutter through the clutch drum to perform trimming work.

In this type of trimmer, however, if the brake device is released while the throttle lever is being gripped, the cutter might suddenly start to rotate at high speed before the safety at surrounding work operations is confirmed and might possibly cause a serious accident.

The object of the present invention is therefore to solve the problem described above and to provide a portable trimmer with improved safety.

SUMMARY OF THE INVENTION

The object of the present invention described above can be achieved by a portable trimmer which comprises: an internal combustion engine; a centrifugal clutch having a clutch drum; a cutter driven by power generated by the internal combustion engine which is transmitted via the centrifugal clutch; a throttle valve; a manual throttle lever for controlling output power of the internal combustion engine by adjusting an opening of the throttle valve via a throttle wire; a friction member arranged opposite to the clutch drum of the centrifugal clutch; a moving member which is connected to the friction member and moves the friction member between a braking position to be pressed against the clutch drum and a non-braking position to be spaced from the clutch drum to release the braking action; a manual release device for moving the moving member from the braking position to the non-braking position; and a release restricting device for controlling activation of the manual release device; the release restricting device having a retaining device whose operation interlocks with a movement of the throttle wire which is controlled by operation of the throttle lever and maintains the release device to be restricted from being released by the release restricting device in a range which is equal to or higher than a predetermined revolution number of the internal combustion engine.

In the present invention, when the centrifugal clutch is under a braking condition, the moving member is in the braking position where the friction member is pressed against the clutch drum. Under this condition, when the operator operates the throttle lever, the release restricting device is activated interlocking with the movement of the throttle wire. When the revolution number of the internal combustion engine is in a range equal to or higher than a predetermined value, the retaining device maintains said release device to be restricted from being released by the release restricting device.

According to the present invention, in the range where the revolution number of the internal combustion engine is equal to or higher than the predetermined value, the operator cannot activate the manual release device, since the actuation of the manual release device is restricted by the release restricting device, whereby the cutter is kept under a braking condition and is prevented from being rotated suddenly. It enables providing improved safety. In addition, since the release restricting device is activated by the movement of the throttle wire, the releasing motion of the manual release device can be controlled in an interlocking manner with the operation of the throttle lever whereby the configuration thereof can be simplified and can be compact.

The present embodiment further comprises a swing member which is connected to an intermediate portion of the throttle wire and is swung by movement of the throttle wire. The release restricting device has a finger member which is pivotably mounted on the same pivoting shaft as the swing member so as to rotate with respect to each other. The retaining device is a spring. The finger member has a claw portion which is pressed against a locking surface formed on the moving member by the spring. The present embodiment further comprises a stopper which is releasably provided between the swing member and the finger member for preventing the finger member from rotating with respect to the swing member more than a predetermined angle by the spring, and wherein the stopper is activated when the revolution number is equal to or more than the predetermined value and is released when the revolution number is under the predetermined value.

In the present embodiment, the stopper is unlocked when the swing member is swung to a high revolution side due to the movement of the throttle wire and the revolution number goes up into a range equal to or higher than the predetermined value, whereby the finger member is pushed by the spring and the claw portion is engaged with the locking surface. When the operator further operates the throttle lever to an accelerating side, the swing member is further pulled by the throttle wire, and the swing member rotates relative to the finger member to allow the throttle wire to be moved further. On the other hand, when the swing member is swung back to a low revolution side due to the movement of the throttle wire and the revolution number goes down below the predetermined value, the stopper is unlocked and the finger member is rotated together with the swing member, whereby the claw portion is disengaged from the locking surface. According to the present embodiment, the release restricting device with a simple configuration acts to make the manual release device inoperable when the revolution number of the internal combustion engine is equal to or higher than the predetermined value, and acts to make it operable to allow the braking of the clutch drum to be manually released when it is less than the predetermined value.

DESCRIPTION OF THE PREFERRED EMBODIMENTS

Figure 1:
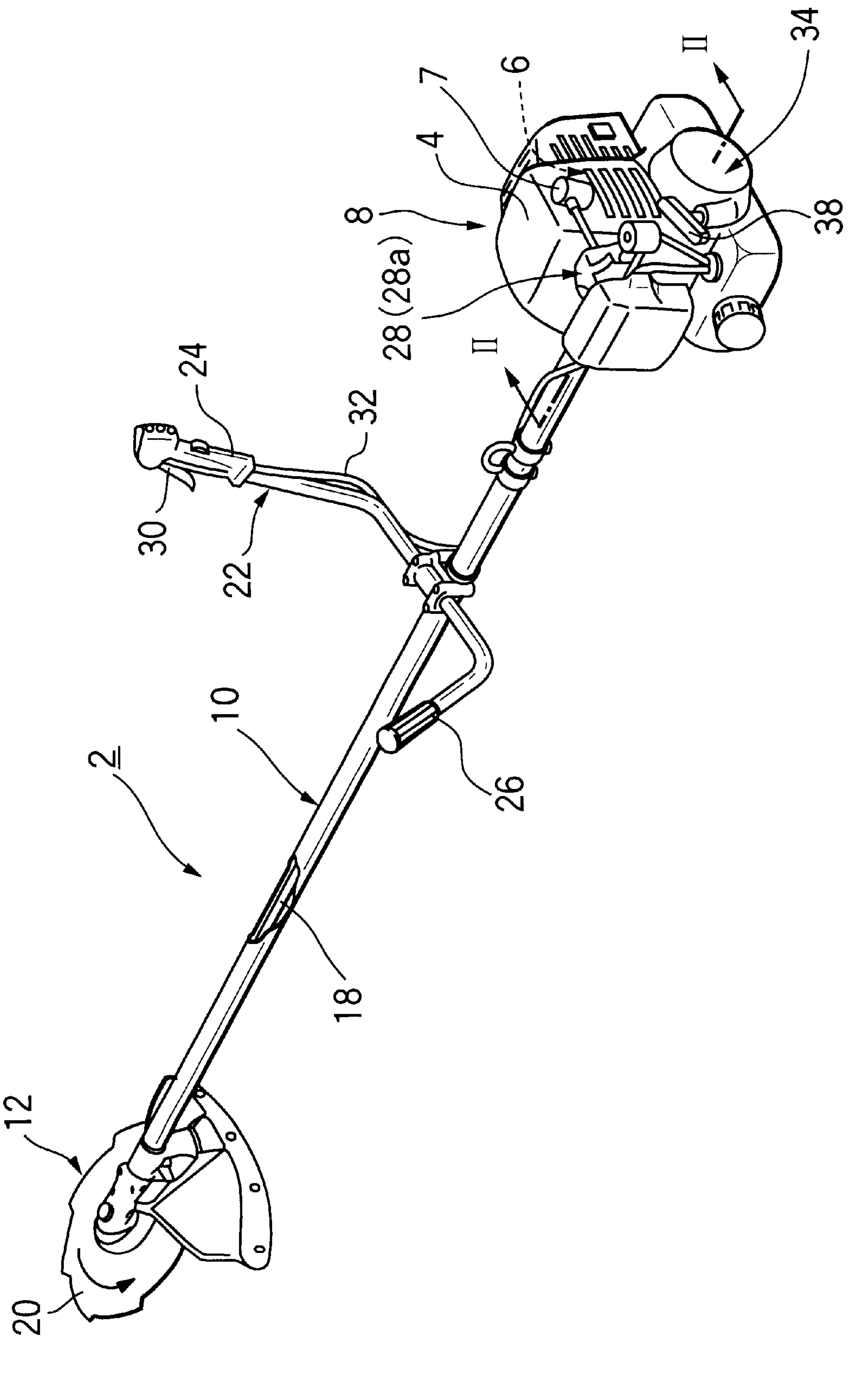
FIG. 1 is an overall perspective view of a portable trimmer according to an embodiment of the present invention.

Referring to the drawing attached herewith, preferred embodiments of the present invention shall now be described by explaining a portable trimmer as one example of portable trimming machines.

The basic structure of the portable trimmer 2 shown in FIG. 1 is well known and typically comprises a power portion 8 having a two-stroke cycle air-cooled compact internal combustion engine 6 accommodated in a housing 4, a supporting tube 10 extending straight forward from the power portion 8, and a rotary cutting blade device 12 provided at the front end of the supporting tube 10. The power from a crankshaft 14 of the internal combustion engine 6 is transmitted via a centrifugal clutch 64 described later and a power transmitting shaft 18 accommodated in the supporting tube 10 to the rotary cutting blade device 12 to rotate a cutter or a cutting blade 20. A handle bar 22 is mounted on a middle portion of the supporting tube 10, and a right grip portion 24 and a left grip portion 26 are mounted respectively on the right and the left ends of the handle bar 22. A throttle lever 30 for controlling and adjusting a throttle opening of a throttle valve 28*a* of a carburetor 28 of the internal combustion engine 6 is provided adjacent to the right grip portion 24. As described in detail later, the throttle lever 30 is connected to the throttle valve 28*a* via a throttle cable 32.

Figure 2:
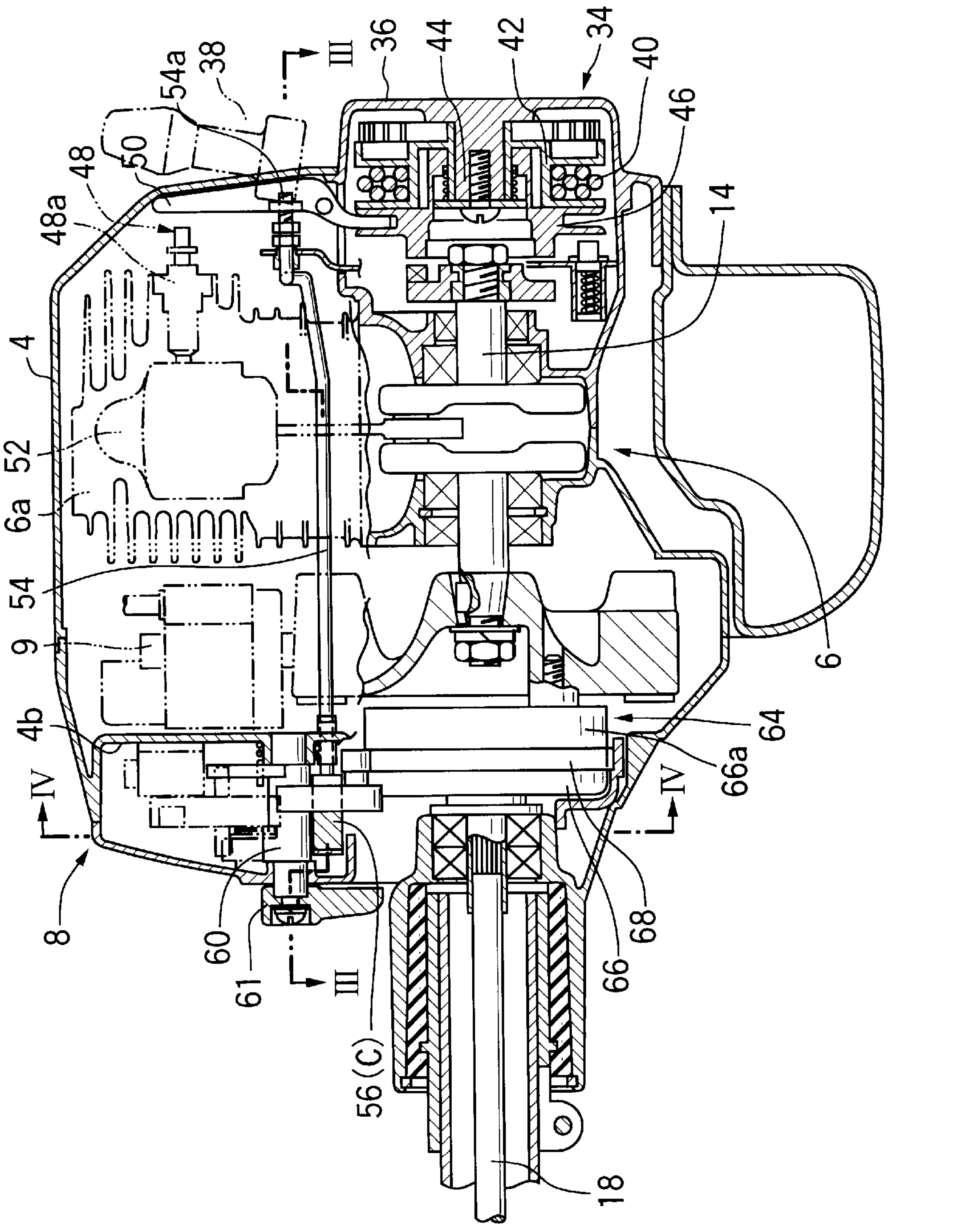
FIG. 2 is a cross-sectional view taken along a line II—II of FIG. 1.

As can be seen in FIG. 2, a recoil starter 34 for starting the internal combustion engine 6 is mounted on a rear portion of the housing 4. The constitution of the recoil starter 34 is well known and is disclosed, for example, in the Japanese Utility Model Laid-Open Publication No. Hei 5-92470. Accordingly, only a schematic description, not a detailed one, will be made on the constitution of the recoil starter 34. The recoil starter 34 comprises a starter cover 36, a recoil drum 42 rotated by pulling a handle 38 attached to an end of a recoil rope 40, and a rotation transmitting member 46 which is supported by a bearing portion 44 formed on the starter cover 36 and, when the recoil drum 42 is rotated, moves forward along a shaft line in a manner of Bendix gear type so that a torque from the recoil drum 42 may be transmitted to the crankshaft 14.

Further, the internal combustion engine 6 of the portable trimmer 2 according to the present embodiment is provided with a decompression device 48. The decompression device 48, though no detailed description thereof will be made herein since it is similarly constituted as the one disclosed, for example, in the Japanese Utility Model Laid-Open Publication No. Hei 5-92470 and is known well, has a pushing member 50 which is engaged with the rotation transmitting member 46 at a lower end portion thereof and extends up to a mounted position of a decompression valve 48*a* attached to a cylinder portion 6*a* of the internal combustion engine 6. When the rotation transmitting member 46 moves forward along the shaft line, the pushing member 50 is moved forward together with the rotation transmitting member 46 to push and open the decompression valve 48*a*. Thereby, a mixture in a combustion chamber 52 of the internal combustion engine 6 is allowed to be discharged out through a decompression passage, though not shown, to a scavenging port to reduce a pressure applied onto a piston head, so that the internal combustion engine 6 can be easily started without applying a large operation force to the recoil starter 34.

Figure 3:
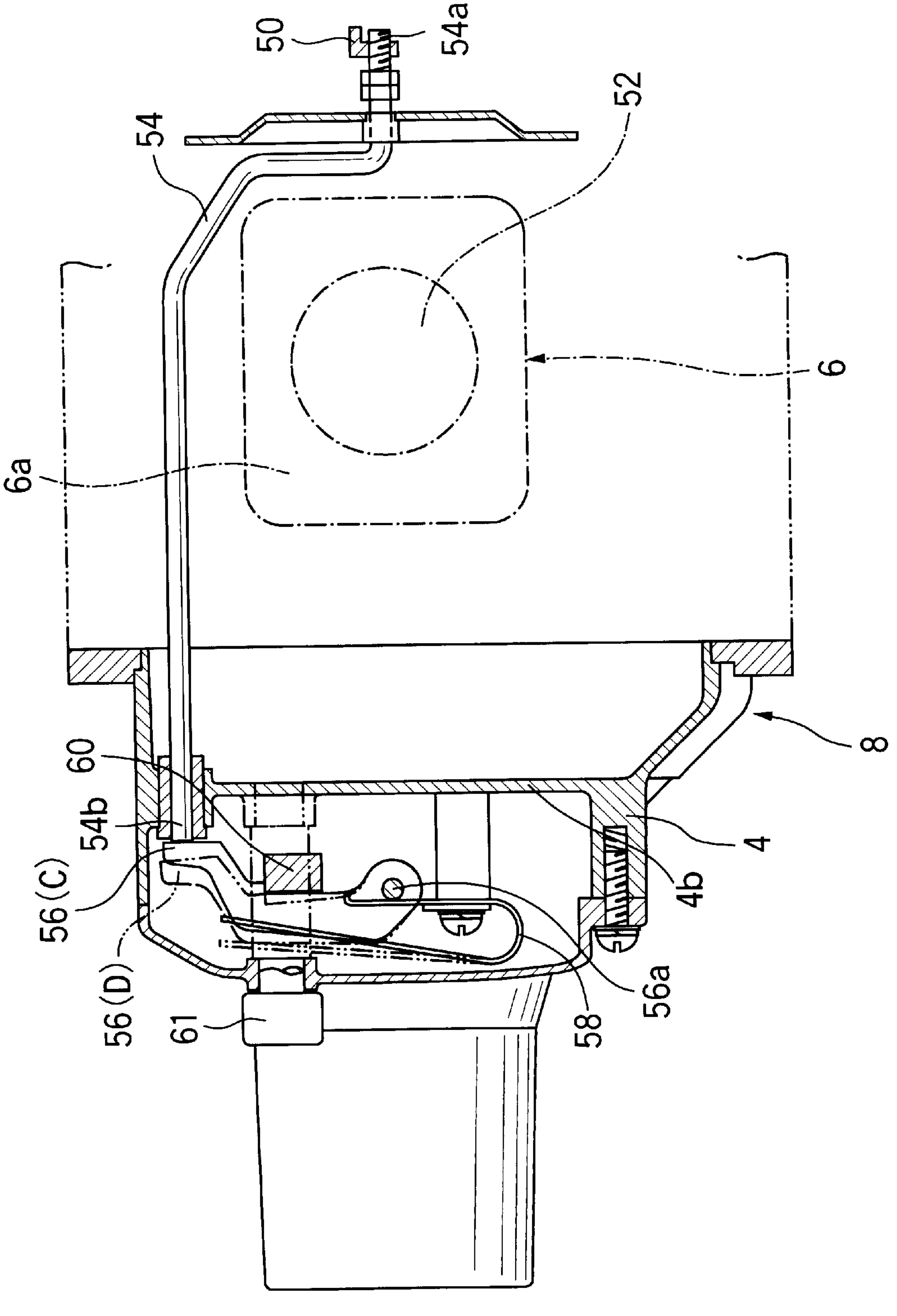
FIG. 3 is a cross-sectional view taken along a line III—III of FIG. 2.

As can be seen in FIG. 3, a shift rod 54 is provided in the housing 4, and is connected to the pushing member 50 at an end 54*a* thereof and extends horizontally deviating at the cylinder portion 6*a* of the internal combustion engine 6 to a front wall 4*b* of the housing 4 so as to be movable parallel with the shaft line direction. In the vicinity of a front end portion 54*b* of the shift rod 54 and in an outer surface side of the front wall 4*b* of the housing 4 is arranged a holding member 56 which is pivotally supported by a third pivoting shaft 56*a* so as to be swingable between a holding position (C) where the holding member 56 is adjacent to the front wall 4*b* of the housing 4 and a retracted position (D) where the holding member 56 is swung away from the front wall 4*b* of the housing 4 (see FIG. 4 also). The holding member 56 is biased toward the holding position (C) by a spring member 58. The holding member 56 is engaged with a lower arm portion 60*a* of a first swing member 60 described below (see FIG. 4) so as to hold the first swing member 60 in a non-braking position "B". Further, on an outer surface of the housing 4, a manual release device or a reset operation portion 61 is provided, which is coaxially joined to the first swing member 60 so as to be rotated together with the first swing member 60. When the rotation transmitting member 46 moves forward along the shaft line, the pushing member 50 is moved forward, and thereby the shift rod 54 is also moved forward and consequently the holding member 56 is moved from the holding position (C) to the retracted position (D).

Figure 4:
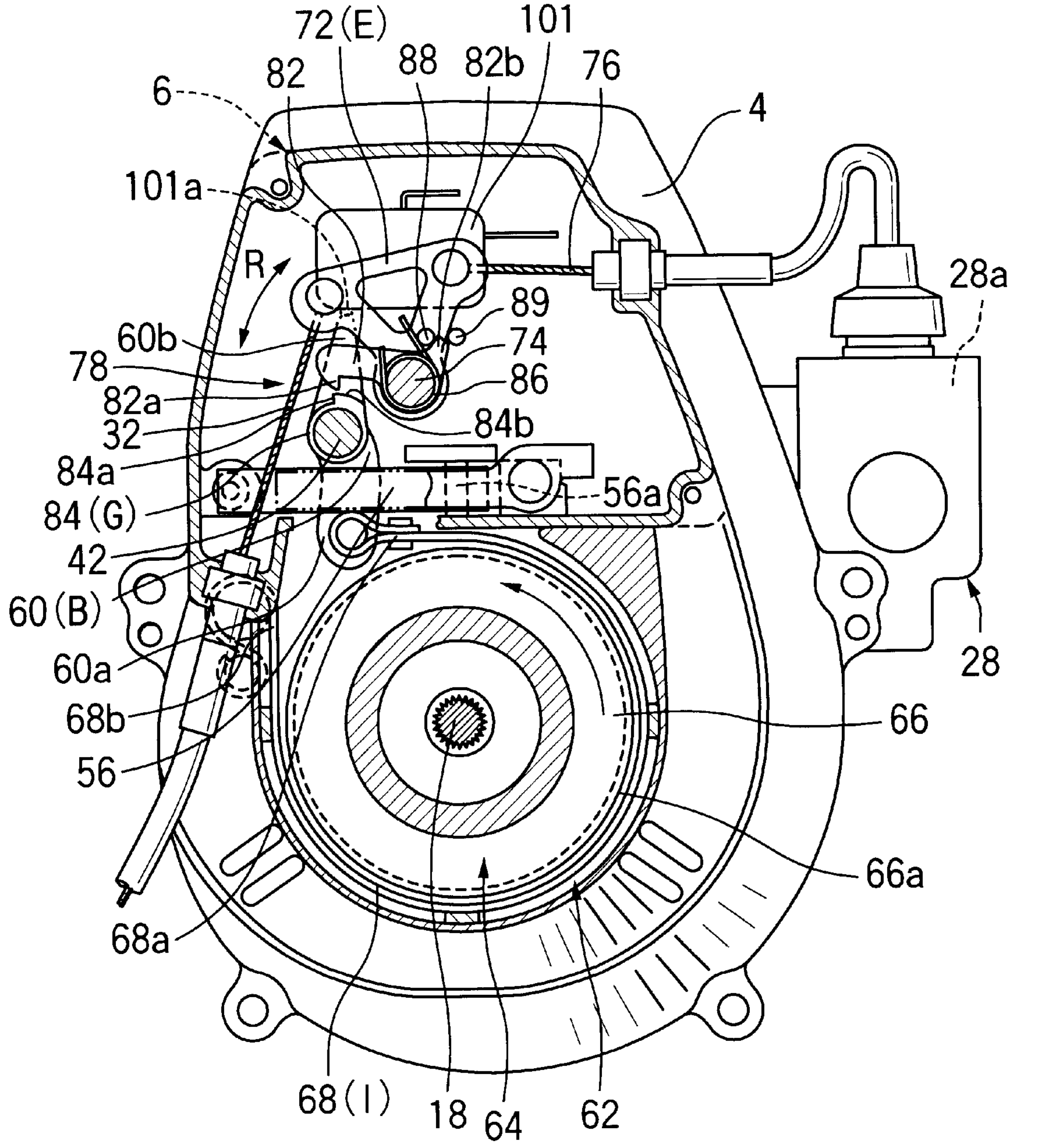
FIG. 4 is a cross-sectional view taken along a line IV—IV of FIG. 2, illustrating an operating condition of a brake device and a release restricting mechanism under low revolution speed.

Referring to FIG. 4, the structure and operation of a brake device 62 and a release restricting mechanism 78 of the portable trimmer 2 according to the present embodiment will now be described in detail. As shown in FIG. 4, the portable trimmer 2 according to the present embodiment has the brake device 62 for preventing the free rotation of the cutting blade 20 while the operator is not doing cutting work. The portable trimmer 2 has a centrifugal clutch 64 operatively joined to the crankshaft 14 of the internal combustion engine 6, the rotation of a clutch drum 66 of the centrifugal clutch 64 is controlled by the brake device 62 which tightens or releases a friction member or a brake band 68 arranged around the clutch drum 66 onto an outer surface 66*a* of the clutch drum 66. The first swing member 60 for applying a braking or a releasing operation by the brake device 62 is mounted on the front wall 4*b* of the housing 4 by a first pivoting shaft 42 arranged approximately at a middle portion of the first swing member 60 so as to be swingable in clockwise and counter-clockwise directions around the first pivoting shaft 42. A lower end portion of the lower arm portion 60*a* of the first swing member 60 is connected to an end 68*a* of the brake band 68 and the first swing member 60 is swung clockwise and counter-clockwise around the first pivoting shaft 42 between the braking position "A" (shown in FIG. 5) where the brake band 68 is moved to a pressing position (J) to be pressed onto the outer surface 66*a* of the clutch drum 66 and the non-braking position "B" (shown in FIG. 4) where the brake band 68 is moved to an away position (I) to be kept away from the outer surface 66*a* of the clutch drum 66. The brake band 68 is made of a strip of spring steel and is bent-formed and arranged so as to apply a certain level of braking force onto the outer surface 66*a* of the clutch drum 66 and the other end 68*b* thereof is attached to the housing 4. Though the first swing member 60 is biased clockwise toward the braking position (A), it is usually held in the non-braking position (B) where the brake band 68 is kept away from the outer surface 66*a* of the clutch drum 66 since the holding member 56 is in the holding position (C).

An upper end portion 60*b* of the first swing member 60 is extended straightly upward and a brake device interlocking switch (micro-switch) 101 is provided adjacent to the upper end portion 60*b*. The brake device interlocking switch 101 is switched between ON and OFF by an up-and-down motion of a moving contact 101*a* thereof, which is caused when the first swing member 60 is swung and whereby the upper end portion 60*b* engages with and moves over the moving contact 101*a*, so that, when the first swing member 60 is in the non-braking position (B), the moving contact 101*a* is pushed to turn on electricity (ON), and, when the first swing member 60 is in the braking position (A), the moving contact 101*a* is released to turn off electricity (OFF).

When looking at the portable trimmer 2 placing the cutting blade 20 on the distal side in FIG. 1, the carburetor 28 is provided on the left outer side of the housing 4, and, as shown in FIG. 4, the throttle valve 28*a* is installed in the carburetor 28 so as to be biased toward an idle speed side of the throttle angle by a spring, though not shown. A second swing member 72 of approximate triangle shape is mounted rotatably on the front wall 4*b* with one of the three corner portions thereof being supported by a second pivoting shaft 74. The other two upper corner portions of the triangle of the second swing member 72 are connected to respective end portions of a first throttle wire portion 32 and a second throttle wire portion 76 respectively. The other end of the first throttle wire portion 32 is connected to the throttle lever 30. The other end of the second throttle wire portion 76 is connected to the throttle valve 28*a*. The first throttle wire portion 32 and the second throttle wire portion 76 respectively extend without play along a bending path "R" placing the second swing member 72 therebetween. When the throttle lever 30 is released, that is, when the internal combustion engine 6 is in its idling condition where the revolution number thereof is usually lower than 3000 rpm, the second swing member 72 is in its idle position (E) shown in FIG. 4. When the throttle lever 30 is gripped, the second swing member 72 is pulled by the first throttle wire portion 32 and is rotated counter-clockwise to a high speed position (F) shown in FIG. 6.

The first pivoting shaft 42 is located, with respect to the second pivoting shaft 74, on the lower side and on the high speed position (F) side in the swing direction of the second swing member 72.

The portable trimmer 2 is provided with a release restricting device or the release restricting mechanism 78 for restricting a release operation applied to the brake device 62 by operating the reset operation portion 61. The release restricting mechanism 78 comprises an engaging member 84 mounted on the first swing member 60 so as to be rotatable together and co-axially therewith around the first pivoting shaft 42, and a finger member 82 one end of which is formed into a claw portion 82*a* protruded downward against the engaging member 84. The engaging member 84 is of approximate circular shape as a whole and on an upper circular portion thereof are formed a steep vertical locking surface 84*a* and a curved contact surface 84*b* adjacent thereto and extending therefrom along a circular direction.

The finger member 82 is supported at the other end portion thereof by the second pivoting shaft 74 so as to be relatively rotatable with respect to the second swing member 72. The finger member 82 is biased by a retaining device or a helical torsion coil spring 86 shown in FIG. 4 so that the claw portion 82*a* is pushed toward the locking surface 84*a*. On the other end portion of the finger member 82, a protrusion 82*b* for preventing the rotation thereof is formed so as to protrude toward the second swing member 72. On the second swing member 72, a pin 88 is provided adjacent to the protrusion 82*b*. As shown in FIG. 4, when the second swing member 72 is in the idle position (E), the pin 88 engages with the protrusion 82*b* and prevents the finger member 82 from rotating toward the engaging member 84 and thereby keeps the claw portion 82*a* of the finger member 82 in a position away from the engaging member 84. When the operator operates the throttle lever 30, and whereby the second swing member 72 is swung toward the high speed position (F) shown in FIG. 6, the pin 88 moves away from the protrusion 82*b* and the engagement with the protrusion 82*b* is released, whereby the finger member 82 is swung toward the engaging member 84 by a biasing force generated by the helical torsion coil spring 86.

On the other hand, as shown in FIG. 4, when the first swing member 60 is in the non-braking position "B", the engaging member 84 is in an unengagable position (G) where the locking surface 84*a* and the claw portion 82*a* do not align with each other, and the claw portion 82*a* faces the contact surface 84*b*. When the first swing member 60 is swung (rotated clockwise) from the non-braking position "B" to the braking position "A", the engaging member 84 is rotated together with the first swing member 60 around the first pivoting shaft 42 and the locking surface 84*a* is moved to an engagable position (H) where the locking surface 84*a* aligns with the claw portion 82*a*.

Referring to FIGS. 4 to 7, the operation of the brake device 62 and the release restricting mechanism 78 according to the present embodiment will be described.

At first, the first swing member 60 is held in the non-braking position (B) shown in FIG. 4 by the holding member 56 and the brake device 62 is released. The second swing member 72 is in contact with a stopper pin 89 provided on the front wall 4*b*, that is, in the idle position (E). The moving contact 101*a* of the brake device interlocking switch 101 is pushed by the upper end portion 60*b* of the first swing member 60 and is in the switched-off condition.

Next, when the operator grips the handle 38 of the recoil starter 34 shown in FIG. 2 and pulls the recoil rope 40, the rotation transmitting member 46 and the pushing member 50 engaged therewith move forward along the shaft line and the shift rod 54 also moves forward parallel with the shaft line. By the movement of the shift rod 54, the holding member 56 is rotated from the holding position (C) shown by a solid line in FIG. 3 to the retracted position (D) shown by a broken line, and the engagement between the holding member 56 and the first swing member 60 is dissolved. Thereby, the first swing member 60 is moved from the non-braking position "B" shown in FIG. 4 to the braking position "A" shown in FIG. 5 by a biasing force generated by the brake band 68 itself, and the brake band 68 is moved to the pressing position (J) to be tightly wound around the outer surface 66*a* of the clutch drum 66. Thereby, the rotation of the clutch drum 66 is automatically restricted and the rotation of the cutting blade 20 is prevented. As the first swing member 60 is swung, the engaging member 84 is rotated from the unengagable position (G) to the engagable position (H) and the locking surface 84*a* is aligned with the claw portion 82*a*. The moving contact 101*a* of the brake device interlocking switch 101 is released and brought into the switched-on condition.

Next, the operator shoulders a strap (not shown) to hold the portable trimmer 2. When the throttle lever 30 is in its released condition, that is, when the internal combustion engine 6 is in its idling condition, the second swing member 72 is not swung and is left in the idle position (E) shown in FIGS. 4 and 5. Accordingly, the finger member 82 is not swung toward the engaging member 84 and the claw portion 82*a* and the locking surface 84*a* are not engaged with each other. Thus, the operator can rotatively operate the reset operation portion 61, and, when the operator manually rotates the reset operation portion 61 counter-clockwise, the first swing member 60 is swung from the braking position (A) shown in FIG. 5 to the non-braking position (B) shown in FIG. 4, whereby the brake band 68 is pushed and loosened to remove the control over the clutch drum 66. Thereby, the holding member 56 is moved from the retracted position (D) to the holding position (C) by a biasing force generated by the spring member 58 and is engaged with the lower portion 60*a* of the first swing member 60 to be held again in the non-braking position "B" shown in FIG. 4. Thus, control by the brake band 68 over the clutch drum 66 is kept in the disengaged condition. As the first swing member 60 is swung, the engaging member 84 is rotated and returned from the engageable position (H) to the unengageable position (G) and the claw portion 82*a* of the finger member 82 is made to face the contact surface 84*b*.

Figure 6:
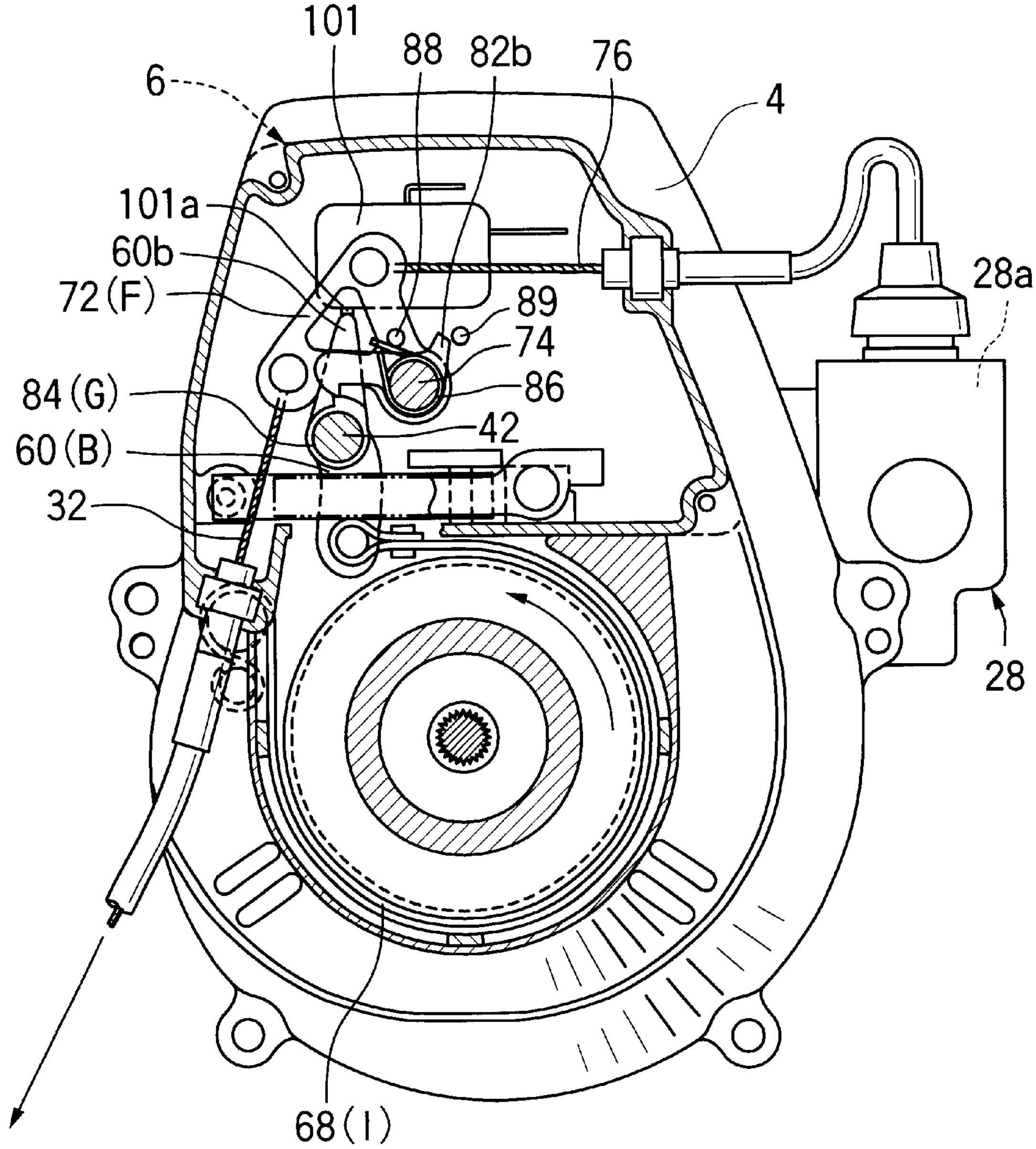
FIG. 6 shows an operating condition of the brake device and the release restricting mechanism of FIG. 4 under high revolution speed.
Figure 7:
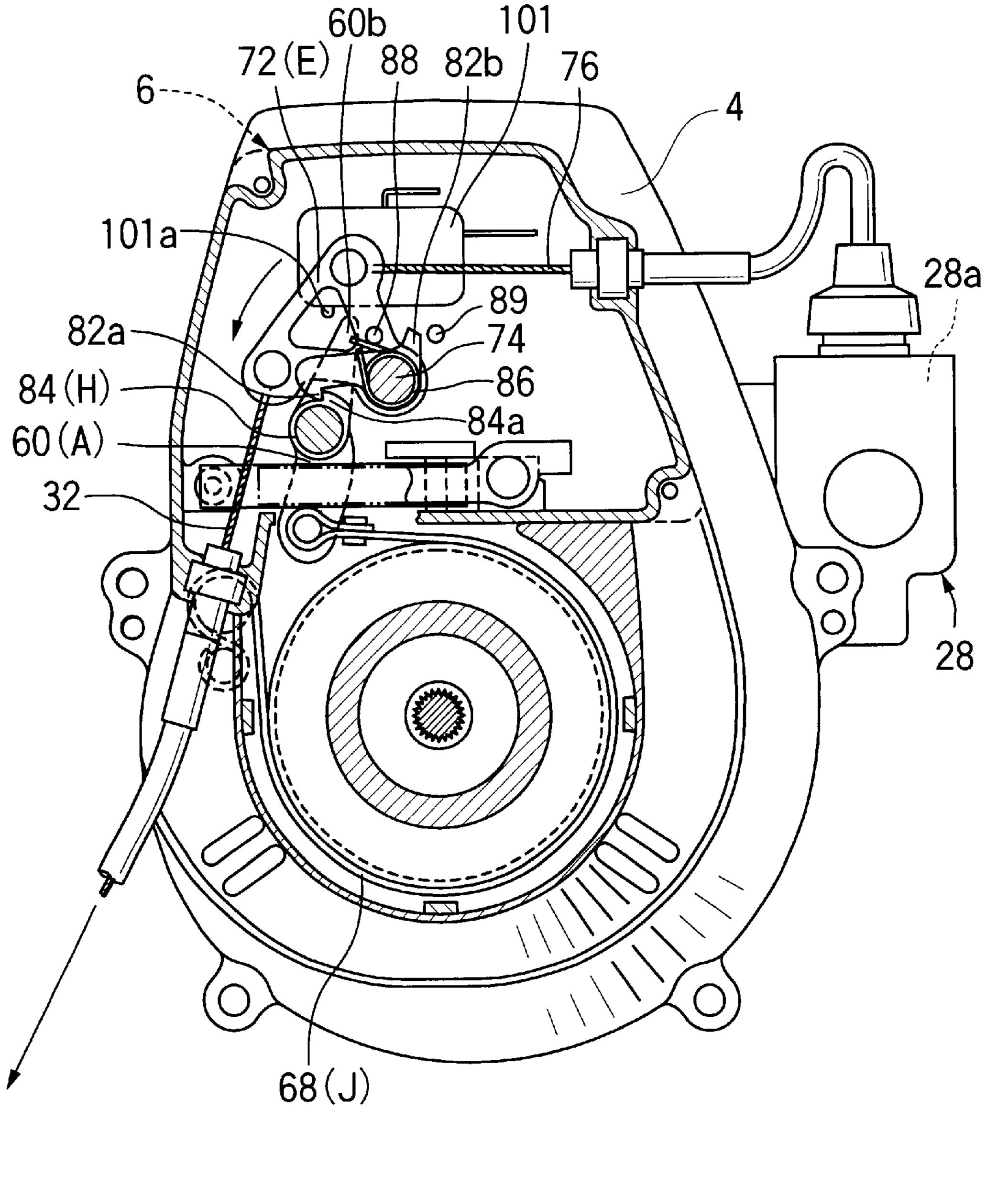
FIG. 7 shows a braking condition of the brake device and the release restricting mechanism of FIG. 6.

Next, when the operator grips the throttle lever 30, the second swing member 72 is pulled by the first throttle wire portion 32 and is swung from the idle position (E) to the high speed position (F) as shown in FIG. 6. At that time, the pin 88 of the second swing member 72 and the protrusion 82*b* of the finger member 82 are disengaged, and the finger member 82 is rotated around the second pivoting shaft 74 toward the engaging member 84. Thereby, the claw portion 82*a* is pressed onto the contact surface 84*b* of the engaging member 84 by a biasing force generated by the helical torsion coil spring 86, and the locking surface 84*a* and the claw portion 82*a* are not engaged with each other.

On the other hand, when, after starting the internal combustion engine 6, the operator grips the throttle lever 30 without releasing the reset operation portion 61, that is, with the brake device 62 being left in the braking condition, the operation is as follows.

Figure 5:
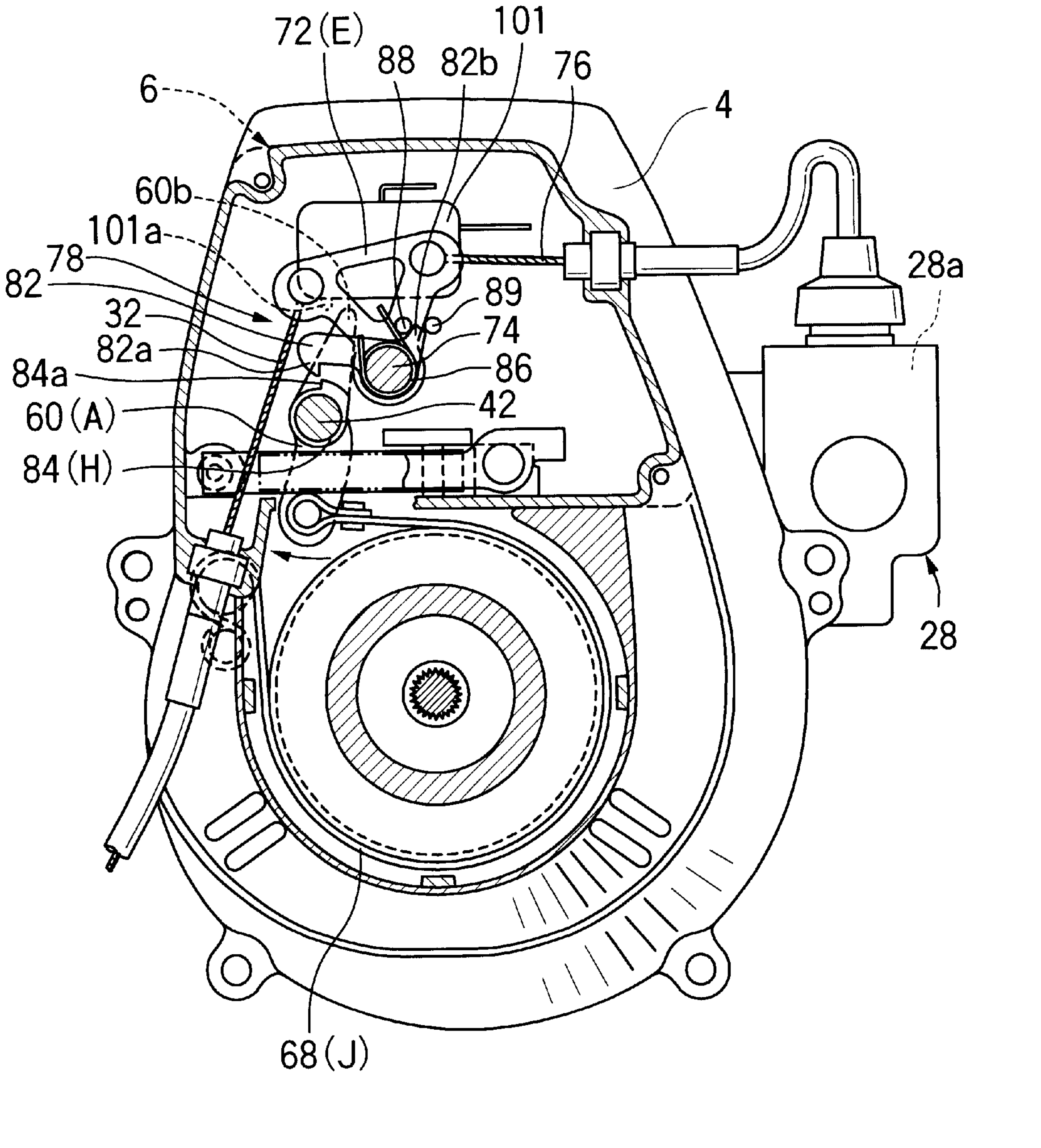
FIG. 5 shows a braking condition of the brake device and the release restricting mechanism of FIG. 4.

Under the condition where the reset operation portion 61 is not released, the first swing member 60 is, as shown in FIG. 5, in the braking position (A), and accordingly the engaging member 84 is in the engageable position (H). The moving contact 101*a* of the brake device interlocking switch 101 is in its released position or in the switched-on condition. Therefore, if the operator grips the throttle lever 30 under this condition, the second swing member 72 is pulled by the first throttle wire portion 32 and is swung from the idle position (E) toward the high speed position (F) shown in FIG. 7. At that time, the engagement between the pin 88 of the second swing member 72 and the protrusion 82*b* of the finger member 82 is dissolved and the finger member 82 is swung around the second pivoting shaft 74 toward the engaging member 84. Thereby the finger member 82 is pressed onto the engaging member 84 by a biasing force generated by the helical torsion coil spring 86. When the operator further grips the throttle lever 30, whereby the revolution number of the internal combustion engine 6 rises up to a first predetermined value N (for example, 3800 rpm), which is higher than a clutch-in revolution number (in the present embodiment, 3500 rpm), the locking surface 84*a* and the claw portion 82*a* engage with each other and hold the first swing member 60 in the braking position (A). When the operator grips the throttle lever 30 harder, though the second swing member 72 is rotated further, the finger member 82 is held in a position pressed onto the engaging member 84 resisting the biasing force applied thereto by the helical torsion coil spring 86. If the operator tries to manually rotate the reset operation portion 61 under this condition, the brake device 62 cannot be released unexpectedly since the locking surface 84*a* and the claw portion 82*a* are engaged with each other and whereby the first swing member 60 is prevented from swinging to the non-braking position (B).

To release the braking operation applied to the clutch drum 66 by the brake device 62, the operator must once release his hold of the throttle lever 30 to lower the revolution number of the internal combustion engine 6 to be lower than the first revolution number. Thereby the second swing member 72 is automatically returned to the idle position (E) shown in FIG. 5 by the biasing force applied to the throttle valve 28*a* toward the throttle angle of the idling speed. At that time, the pin 88 moves to engage with the protrusion 82*b* and pushes and returns the finger member 82 so as to move away from the engaging member 84, whereby the claw portion 82*a* and the locking surface 84*a* are disengaged. Under this condition, the operator can manually rotate the reset operation portion 61 and then the first swing member 60 returns to the non-braking position (B) shown in FIG. 4 and the braking operation by the brake device 62 is discontinued. The moving contact 101*a* of the brake device interlocking switch 101 is pushed by the upper end portion 60*b* of the first swing member 60 and is brought into switched-off condition.

Figure 8:
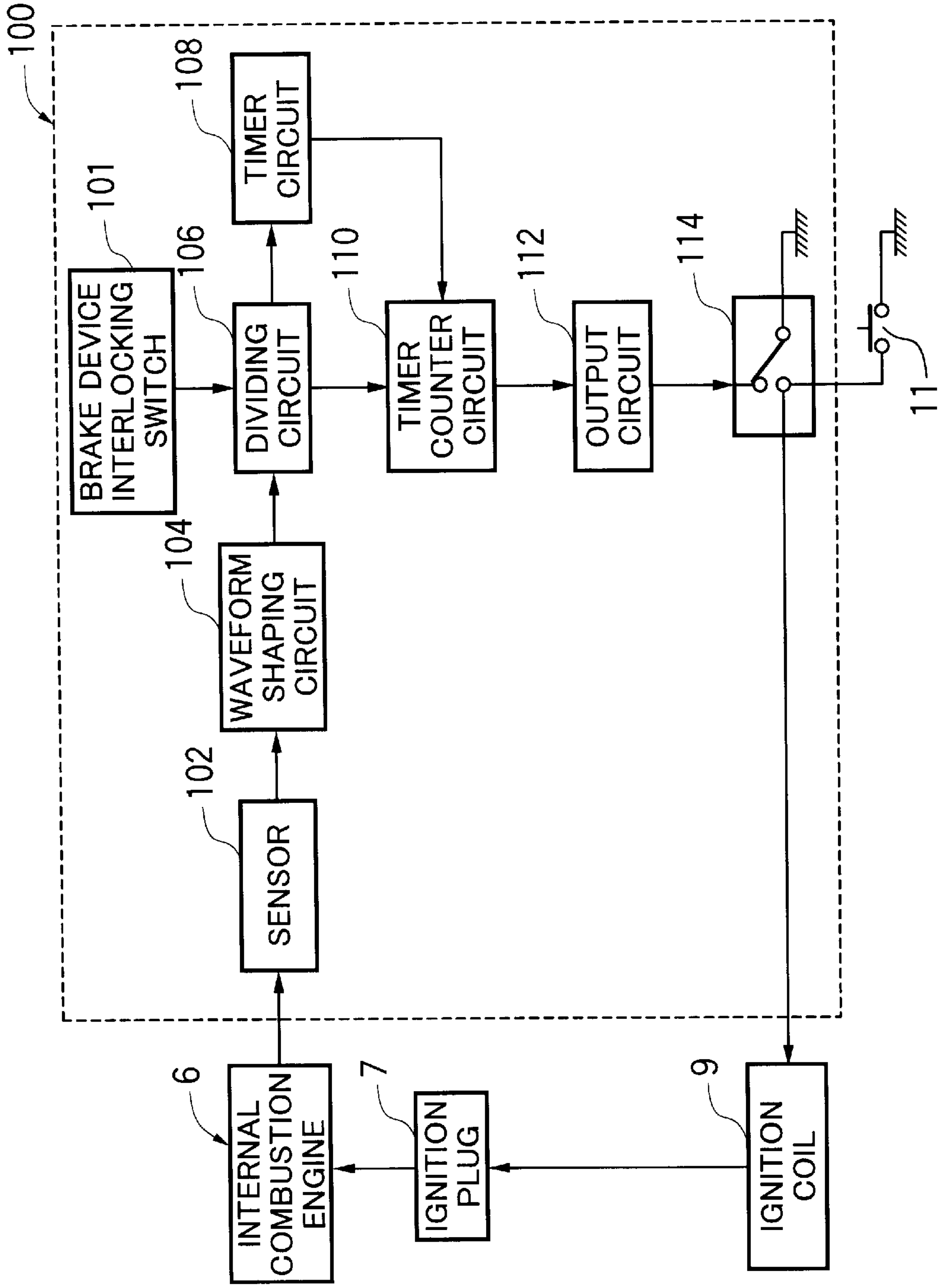
FIG. 8 is a block diagram illustrating a first embodiment of a safety device for stopping an internal combustion engine.

FIG. 8 is a block diagram illustrating a first embodiment of a safety device for stopping the operation of the internal combustion engine 6.

The portable trimmer 2 has a safety device 100 for stopping the operation of the internal combustion engine 6 when the throttle lever 30 is gripped so as for the revolution number of the internal combustion engine 6 to increase to a second predetermined value higher than the clutch-in revolution number and the brake device 62 is left in its operating condition. If the engine revolution is left at the second predetermined revolution number which is higher than the clutch-in revolution number under the condition where the brake band 68 is pressed onto the clutch drum 66, there occurs a slipping between the clutch drum 66 and the brake band 68, which results in premature wear and seizure of respective members. The object of the safety device 100 is to stop the internal combustion engine 6 automatically to prevent such accidents.

The safety device 100 comprises the brake device interlocking switch 101 for controlling the turning-off or -on of the electricity to the safety device 100 interlocking with the operation of the braking device 62 controlled by the swinging motion of the first swing member 60, a sensor 102 for detecting ignition noise radio waves from the internal combustion engine 6, a waveform shaping circuit 104 for waveform-shaping into a pulse a signal generated by the ignition noise radio waves from the engine 6 and detected by the sensor 102, a dividing circuit 106 which counts the pulse number output from the waveform shaping circuit 104, and generates an output signal when the pulse number per a predetermined time period is equal to or more than a predetermined value, and is reset without generating the output signal when the pulse number per the predetermined time period is less than the predetermined value, a timer circuit 108 for outputting a signal every predetermined time period and for resetting the dividing circuit 106, a timer counter circuit 110 for sending a signal to an output circuit 112 described below when the signal from the dividing circuit 106 continues successively for more than a predetermined time period, and the output circuit 112 for turning on a relay 114 for a predetermined time period based on the signal from the timer counter 110. The safety device 100 is incorporated with an electric spark type ignition circuit of the internal combustion engine 6 including an ignition plug 7, an ignition coil 9 and a stop switch 11 provided on the portable trimmer 2.

When the internal combustion engine 6 is actuated and the first swing member 60 is automatically moved to the braking position (A) and the brake device interlocking switch 101 is released to turn on electricity, the ignition noise radio waves is detected by the sensor 102 and the signal thereof is sent to the waveform shaping circuit 104. This signal is waveform-shaped by the waveform shaping circuit 104 and then sent to the dividing circuit 106. The dividing circuit 106 counts the number of the shaped signal pulses and sends the output signal to the timer counter circuit 110 when, based on the signal sent from the timer circuit 108, for example, every one second, the number of the signals per second is equal to or more than the pulse number corresponding to the second predetermined revolution. On the contrary, when the number of the counted signals during a second is less than the pulse number for the second predetermined revolution, the dividing circuit 106 is reset by the timer circuit 108 and sends no signal to the timer counter circuit 110. When the signals from the dividing circuit 106 continue, for example, for 16 seconds, the timer counter circuit 110 sends the signal to the output circuit 112, and the output circuit 112 turns on the relay 114 for a predetermined period of time. Thereby, the voltage generated by the ignition coil 9 is discharged to ground and accordingly the internal combustion engine 6 is automatically stopped.

Figure 9:
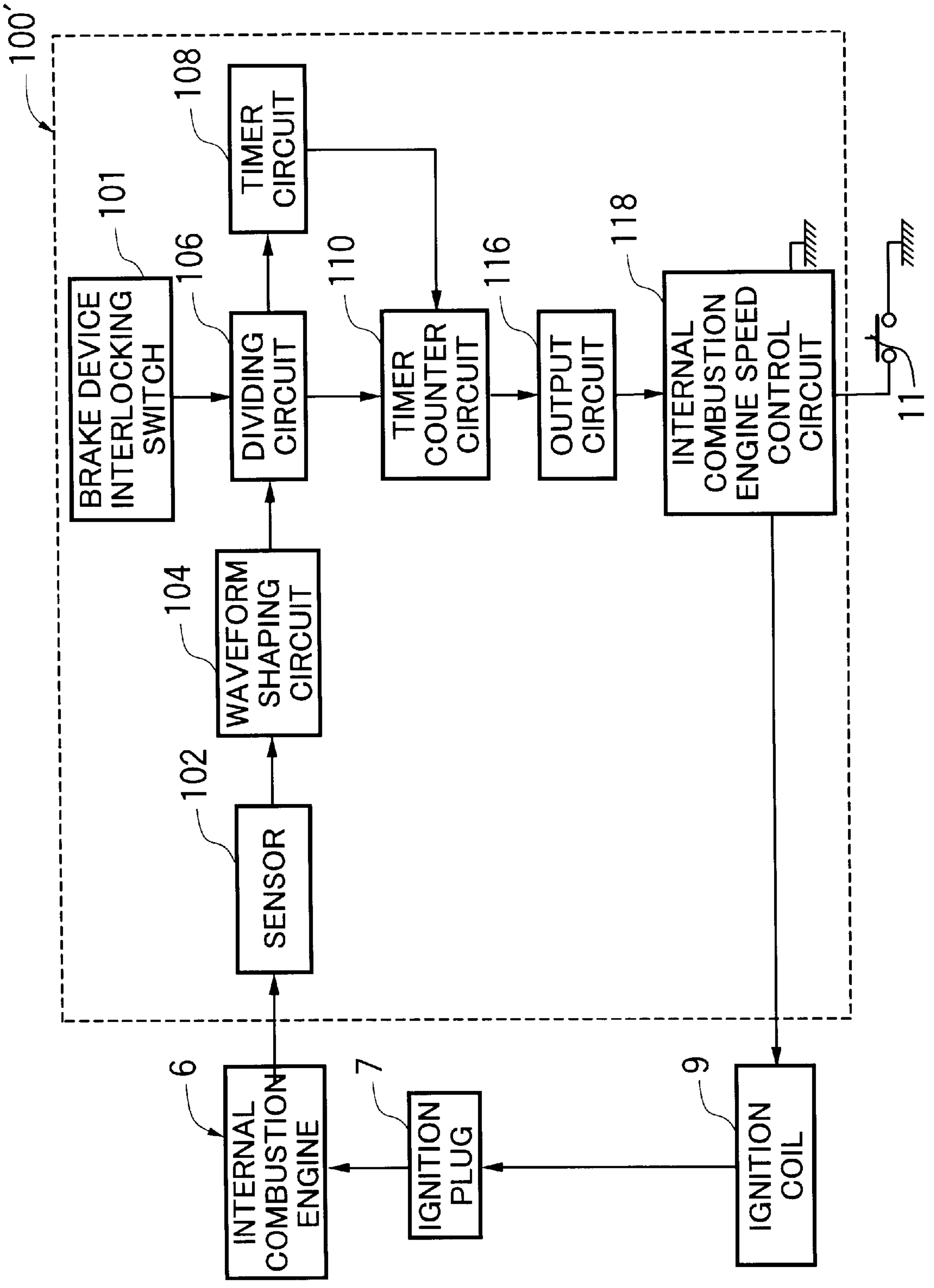
FIG. 9 is a block diagram illustrating a second embodiment of a safety device for stopping the internal combustion engine.

FIG. 9 is a block diagram illustrating a second embodiment of a safety device for stopping the internal combustion engine 6.

As shown in FIG. 9, the safety device 100' according to the second embodiment is constituted substantially in the same manner with the safety device 100 of the first embodiment described above with the exception that, in place of the relay 114 of the first embodiment 100 for automatically stopping the internal combustion engine 6 under the braking condition generated by the brake device 62, an internal combustion engine speed control circuit 118 is provided for lowering the revolution speed of the internal combustion engine 6 during braking by the brake device 62 to a speed lower than the clutch-in revolution speed of the centrifugal clutch 64. Also, the operation of an output circuit 116 differs from that of the output circuit 112 of the safety device 100 according to the first embodiment. Therefore, only the internal combustion engine speed control circuit 118 will be described below.

Figure 10:
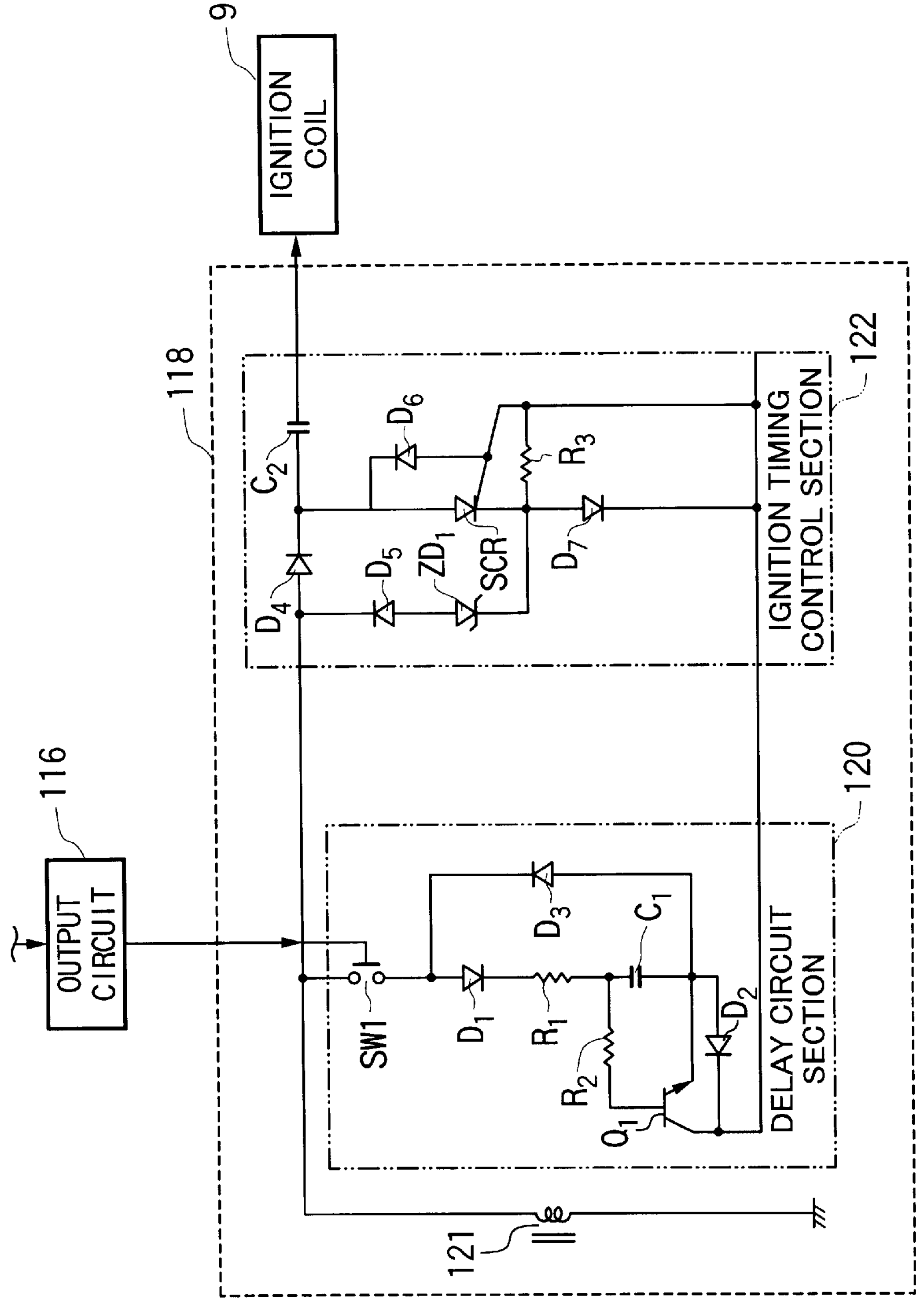
FIG. 10 is a circuit diagram of a revolution speed control circuit of the internal combustion engine shown in FIG. 9.

FIG. 10 is an example of a circuit diagram of the internal combustion engine speed control circuit 118 shown in FIG. 9.

In FIG. 10, reference numeral 121 is an exciter coil, 120 is a delay circuit section, and 122 is an ignition timing control section. The output waveform of the exciter coil 121 provides an alternating voltage as shown in FIG. 11A. A trigger level on the drawing will be described below.

The delay circuit section 120 comprises a delay switch SW1 connected to the output circuit 116, and other main components of the delay circuit 120 including a transistor Q1, resistors R1, R2, a capacitor C1, and diodes D1, D2, D3 for blocking reverse current. When the brake device interlocking switch 101 is turned on and thereby the electric current is applied to the output circuit 116, the delay switch SW1 is turned on, and, when the brake device interlocking switch 101 is turned off and thereby the electric current supply to the output circuit 116 is cut off, the delay switch SW1 is turned off. The ignition timing control section 122 comprises a capacitor C2, a thyristor SCR and a diode D4 for applying or blocking the electric current to the ignition coil 9, a resistor R3 and a zener diode ZD1 for setting the trigger level of the thyristor SCR, and diodes D5, D6, D7 for blocking the reverse current.

Figure 11:
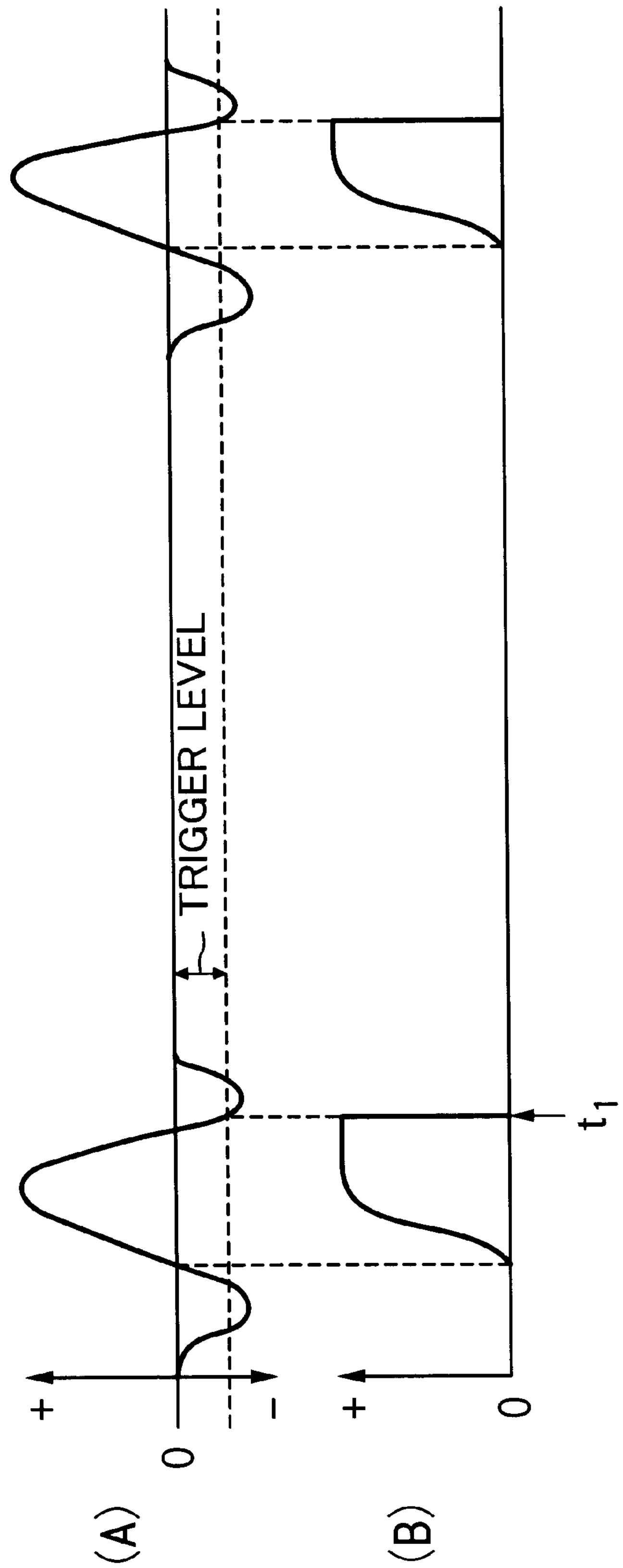
FIG. 11 shows waveforms at respective portions when a delay circuit is under inactive condition.
Figure 12:
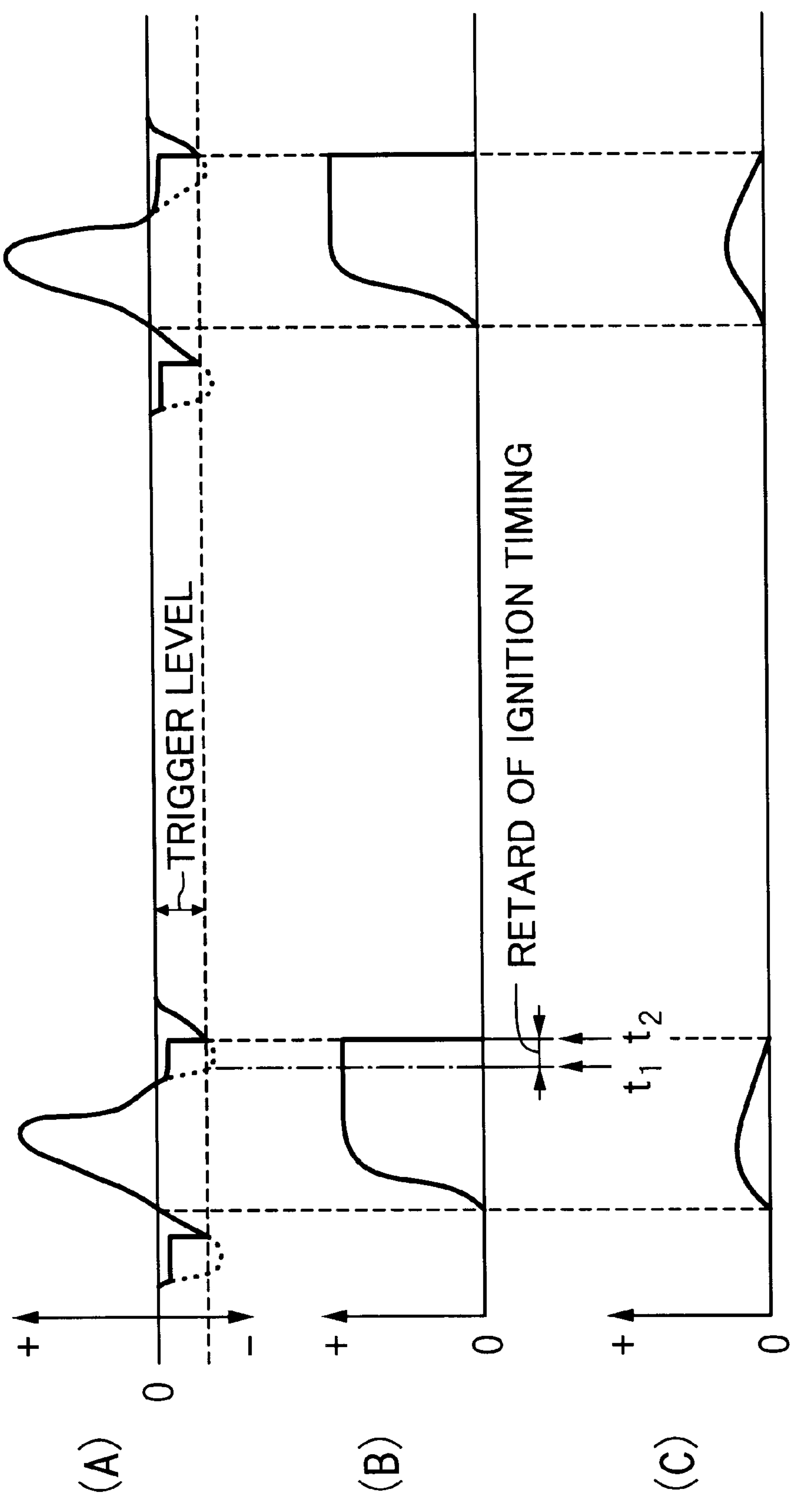
FIG. 12 shows waveforms at respective portions when a delay circuit is under active condition.

FIG. 11 shows waveforms at respective portions when the delay 7 circuit section 120 is in its inactive condition. FIG. 12 shows waveforms at respective portions when the delay circuit section 120 is in its active condition.

The operation of the internal combustion engine speed control circuit 118 will now be described with reference to FIGS. 10, 11, 12. First of all, the case where, resulting from the actuation of the internal combustion engine 6 by the recoil starter 34, the brake device 62 automatically generates a braking condition and the brake device interlocking switch 101 is turned on and whereby the electric current is applied to the dividing circuit 106, will be described. The operations of the sensor 102, the waveform shaping circuit 104, the dividing circuit 106, the timer circuit 108 and the timer counter circuit 110 will be omitted since they are the same as those of the first embodiment.

Upon receiving the signal from the timer counter circuit 110, the output circuit 116 applies the electric current to the internal combustion engine speed control circuit 118. Thereby the delay switch SW1 is placed in a turned-on condition. A positive voltage of the exciter coil 121 passes through the diode D4 to charge the capacitor C2 and at the same time passes through the diode D1 and the resistor R1 of the delay circuit section 120 to charge the capacitor C1. The charged voltage of the capacitor C1 is discharged through the resistor R2 and the transistor Q1, and, at that time, the base and the emitter of the transistor Q1 are turned to a conducting state for a certain duration with a discharge time constant defined by the capacitance of the capacitor C1 and the resistance value of the resistor R2.

When a negative voltage is generated in the exciter coil 121 while the transistor Q1 is in the conducting state, the negative current is made to bypass through the emitter and collector of the transistor Q1, the diode D3, and the delay switch SW1 of the delay circuit 120. Accordingly the negative voltage of the exciter coil 121 is made lower. Thus, the trigger level is not reached between the gate and the cathode of the thyristor SCR of the ignition timing control section 122.

Due to the discharge time constant defined by the capacitor C1 and the resistor R2 of the delay circuit 120, when the certain duration has passed, the conducting state of the transistor Q1 is turned off. Consequently, the negative voltage of the exciter coil 121 which has been made to bypass is applied between the gate and the cathode of the thyristor SCR, and, when the voltage therebetween reaches the trigger level, the thyristor SCR is turned on. The zener voltage of the zener diode ZD1 is determined with the voltage drop of the delay circuit 120 taken into account to stabilize the behavior of the thyristor SCR. When the thyristor SCR is turned on, the capacitor C2 of the ignition timing control section 122 begins to discharge the same as in the case of the delay switch SW1 being turned off, this discharge excites the ignition coil 9 to produce a high voltage in a secondary side thereof and makes the ignition plug 7 generate a spark discharge.

FIG. 12 shows an output waveform (A) of the exciter coil 121, a charging and discharging waveform (B) of the capacitor C2, a charging and discharging waveform (C) of the capacitor C1, and ignition timings t1, t2, wherein it is shown that the ignition timing is retarded in the case of the ignition timing t2 where the ignition delay circuit section 120 is actuated (the delay switch SW1 is in ON) compared with that of the normal ignition timing t1 (where the delay switch SW1 is in OFF). Since a predetermined amount of retard is produced in the delay circuit section 120, the revolution of the internal combustion engine 6 can be automatically lowered. The retard amount of the ignition timing may be determined so that the revolution of the internal combustion engine 6 could be lowered to be less than the clutch-in revolution of the centrifugal clutch 64 even if the throttle valve 28*a* would be in the full throttle condition.

For example, in the internal combustion engine 6 with a displacement of about 25 mL to 40 mL, it is preferable that, when the normal ignition timing is between 25 to 30 degrees before top dead center (BTDC 25–30 degrees) and the clutch-in revolution is between 3000 to 3600 r/min, the ignition timing is retarded by the delay circuit 120 to be within the range of 5 degrees before to 5 degree after top dead center (BTDC 5 degrees—ATDC 5 degrees) and whereby the revolution of the internal combustion engine 6 is lowered to 2000 to 3000 rpm.

The case where the brake device 62 is released and the brake device interlocking switch 101 is turned off and whereby the electric current supply to the dividing circuit 106 is cut off (the delay switch SW1 is in OFF) will now be described. The positive voltage of the alternating voltage generated in the exciter coil 121 charges the capacitor C2 through the diode D4 of the ignition timing control section 122. While the exciter coil 121 generating a positive voltage, the gate and the cathode of the thyristor SCR have the same level of potential, whereby the thyristor SCR is in a cut-off state. When the voltage of the exciter coil 121 is changed from positive to negative voltage, the electric current is applied through the resistor R3, the zener diode ZD1 and the diode D5, and, when a potential difference between the gate and the cathode of the thyristor SCR exceeds the trigger level shown in FIG. 11A, the thyristor SCR changes to a conducting state. An anode of the thyristor SCR is kept at a positive voltage by the capacitor C2.

Due to the conduction of the thyristor SCR, the charged voltage of the capacitor C2 is discharged through the thyristor SCR, the diode D7 and a primary side of the ignition coil 9. At that time, the ignition coil 9 is excited to produce a high voltage in the secondary side thereof, whereby the ignition plug 7 generates the spark discharge.

This spark discharge provides the ignition timing of the internal combustion engine 6. This ignition timing is determined by the negative voltage of the exciter coil 121, the gate-ON voltage of the thyristor SCR and the zener voltage of the zener diode ZD1. FIG. 11 shows an output waveform (A) of the exciter coil 121, a voltage waveform (B) of the capacitor C2 and the normal ignition timing t1, wherein substantially the constant ignition timing is provided over the entire revolution range of the internal combustion engine 6. Typically, the ignition timing is about 25 to 30 degrees before top dead center (BTDC 25–30 degrees).

According to the present embodiment, only when the operator releases the throttle lever 30 to decrease the revolution of the internal combustion engine 6 to be lower than the first revolution, the control applied to the clutch drum 66 by the brake device 62 may be released. Accordingly, a dangerous situation can be avoided that might possibly occur when the operator releases the brake device 62 while keeping the throttle lever 30 gripped, that is, while keeping the internal combustion engine 6 in the high speed condition, and consequently the clutch drum 66 is suddenly revolved at high speed and the cutting blade 20 is also driven at high speed.

In addition, according to the present embodiment, the engagement and the disengagement operations by the release restricting mechanism 78 are interlocked through the second swing member 72 with the operation applied to the throttle lever 30. Accordingly, since the operation of the release restricting mechanism 78 does not depend on the operation of the operator but is interlocked with the operation applied to the throttle lever 30 so as to be automatically controlled, the unexpected high speed revolution of the cutting blade 20 can dependably be prevented to improve safety.

Moreover, according to the first safety device 100 shown in FIG. 8, since the internal combustion engine 6 can be stopped automatically when the internal combustion engine 6 is left to be driven in a revolution range equal to or greater than the second predetermined revolution for a predetermined time period (in the above described embodiment, 16 seconds) without releasing the brake device 62, the premature wear and a seizure of the clutch drum 66, the brake band 68 or the like can dependably be avoided.

In addition, according to the second safety device 100' shown in FIG. 9, since the revolution speed of the internal combustion engine 6 is automatically controlled to be lower than the clutch-in revolution of the centrifugal clutch 64 by the internal combustion engine speed control circuit 118 when the internal combustion engine 6 is left to be driven in a revolution range equal to or greater than the second predetermined revolution for a predetermined time period (in the above described embodiment, 16 seconds) without releasing the brake device 62, the clutch drum 66 is never driven and the premature wear and a seizure of the clutch drum 66, the brake band 68 or the like can be avoided.

Furthermore, according to the second safety device 100' shown in FIG. 9, since the internal combustion engine 6 is not completely stopped but the revolution thereof is merely decreased, the operator need not trouble to start the internal combustion engine 6 again even if, after having left the brake device 62 in the braking condition, he releases the brake device 62 to start his cutting work again.

It is a matter of course that the present invention is not limited to the embodiments described above but may be modified in various manners without departing from the scope of the invention defined in the appended claims and such modifications may be included within the scope of the present invention.

For example, though, in the above embodiments, the brake band 68 is moved between the released position (I) and the depressed position (J) by the swing motion of the first swing member 60 around the first pivoting shaft 42, the first swing member 60 does not necessarily have to be swingable but may be made to be laterally slidable so that thereby the brake band 68 may be moved between the released position (I) and the depressed position (J). In this case, only the requirement is that the locking surface 84*a* may align with the claw portion 82*a* of the finger member 82 when the first swing member 60 is in the braking position (A).

In addition, though the finger member 82 is swung by the second swing member 72 which in turn is swung by the movement of the throttle wires 32, 76, the finger member 82 may be connected to other members which may be swung synchronously with the movement of the throttle wires 32, 76.

Further, the safety devices 100, 100' shown in FIGS. 8, 9 are designed to actuate when the brake device 62 is left in the braking condition while the throttle lever 30 is gripped, whereby the revolution speed of the internal combustion engine 6 is maintained greater than the second predetermined revolution number. The pulse number to be counted by the dividing circuit 106 may be appropriately determined based on the second predetermined revolution number at which the safety device 100 or 100' actuates. The duration of the signal from the dividing circuit 106, which is measured by the timer counter 110, may be appropriately determined to be within the range of the time period where the brake device 62 may be left in the braking condition without causing a premature wear of the clutch drum 66 and the brake band 68, which depends on the relationship between the materials of the clutch drum 66 and the brake band 68.

The first predetermined revolution number of the internal combustion engine 6 at which the release restricting mechanism 78 actuates may be determined to be an appropriate value which allows the safety to be secured even if the operator releases the brake device 66, whereby the cutting blade 20 starts to be driven.

What is claimed is:

1. A portable trimmer, comprising:

an internal combustion engine;

a centrifugal clutch having a clutch drum;

a cutter driven by power generated by said internal combustion engine and transmitted via said centrifugal clutch;

a throttle valve;

a manual throttle lever for controlling output power of said internal combustion engine by adjusting said throttle valve via a throttle wire;

a friction member arranged opposite said clutch drum of said centrifugal clutch;

a moving member connected to said friction member and moving said friction member between a braking position to be pressed against said clutch drum and a non-braking position to be spaced from said clutch drum to release the braking action;

a manual release device for moving said moving member from said braking position to said non-braking position;

a release restricting device for controlling activation of said manual release device;

said release restricting device having a retaining device whose operation interlocks with a movement of said throttle wire which is controlled by operation of said throttle lever and maintains said release device to be restricted from being released by said release restricting device in a range which is equal to or greater than a predetermined revolution number of said internal combustion engine; and a safety device automatically making a revolution number of said internal combustion engine less than said predetermined revolution number when said friction member is kept, for a certain period of time, under said braking condition with said friction member being pressed against said clutch drum while the revolution number of said internal combustion engine is equal to or greater than said predetermined revolution number by operation of said throttle lever.

2. A portable trimmer in accordance with claim 1 further comprising:

a swing member mounted on a pivoting shaft and which is connected to an intermediate portion of said throttle wire and is swung by movement of said throttle wire, said release restricting device has a finger member which is pivotably mounted on the pivoting shaft so that said finger member and said swing member rotate with respect to each other, said retaining device is a spring, said finger member has a claw portion which is pressed against a locking surface formed on said moving member by said spring; and further comprising a stopper which is releasably provided between said swing member and said finger member for preventing said finger member from rotating with respect to said swing member more than a predetermined angle by said spring, and wherein said stopper is activated when the revolution number is equal to or greater than said predetermined revolution number and is released when the revolution number is less than said predetermined revolution number.

* * * * *